June 11, 1929.
A. WATTERS
1,716,399
COMPRESSION GAUGE
Filed Feb. 24, 1923
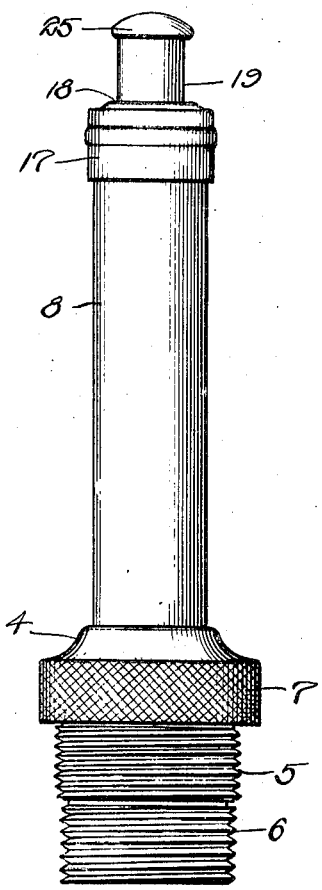
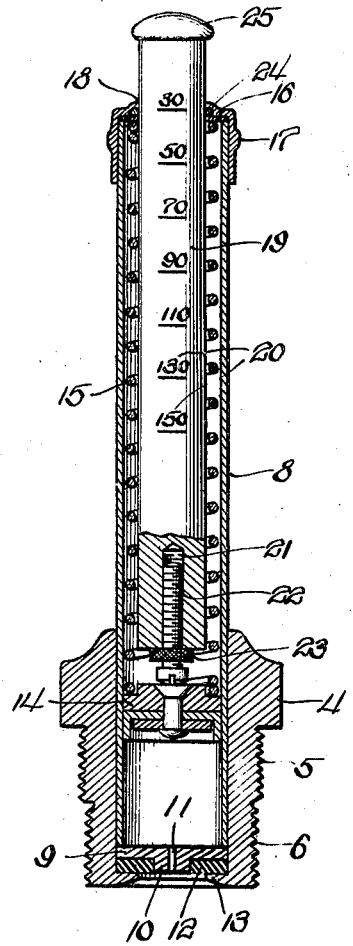
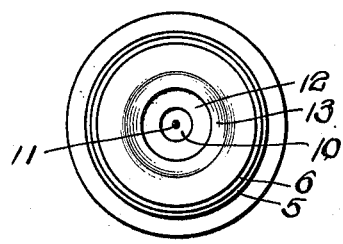
Witness:
U. K. Olson
Inventor:
ALEX WATTERS
By Glenn S. Noble Atty.

Patented June 11, 1929.

1,716,399

UNITED STATES PATENT OFFICE.

ALEX WATTERS, OF CHICAGO, ILLINOIS.

COMPRESSION GAUGE.

Application filed February 24, 1923. Serial No. 620,861.

This invention relates more particularly to devices for testing the compression in internal combustion engines although it may of course be used for testing pressures wherever it may be applicable.

The objects of this invention are to provide a simple and efficient gauge for testing engines; to provide a gauge of this character which will be sufficiently light so that it may be readily carried in the pocket; to provide a gauge which is adapted to be used with different sized outlets or spark plug openings and also with other outlets or valves; and in general to provide such an improved gauge as will be described more fully hereinafter.

In the accompanying drawings illustrating this invention:

Figure 1 is a side view showing the indicating member in partly raised position;

Figure 2 is a longitudinal sectional view; and

Figure 3 is an end view.

In these drawings the device is shown on an enlarged scale as compared with the common commercial forms.

The particular form of the device shown in these drawings has a base or coupling portion 4 which is threaded at its lower end for engagement with the usual threaded opening provided in an engine for the spark plug. As different engines have different threads for different plugs, I prefer to provide the connector with a plurality of such threaded portions so that the device may be used for different engines. For instance, the threads shown at 5 are adapted for one type of plug opening while the threads shown at 6 are adapted for another type of plug opening. This base or connector is also preferably provided with a knurled portion 7 for convenience in turning the same either by hand or with a suitable wrench or tool. A cylindrical body portion or tube 8 fits in the connector 4 and is held in position by being forced therein or in any other suitable manner. A plate or washer 9 fits over the open end of the cylinder 8 and has a projection 10 for engagement with the stems of certain valves when the device is to be used in connection therewith. This washer has an inlet hole 11 for admitting air into the cylinder. A rubber washer or gasket 12 is placed between the washer 11 and the apertured end 13 of the connector 4, this end being in the nature of an annular flange against which the washer may be pressed when the parts are assembled.

A piston 14 is placed in the cylinder 8 and is adapted to be raised by the pressure. A spring 15 engages with the piston 14 and with a fixed abutment 16 at the outer end of the tube or cylinder 8. This abutment is conveniently provided by placing a washer over the end of the tube and holding the same in position by a cap 17 which has an inwardly extending flange 18.

A slidable and adjustable indicating member coacts with the spring piston or plunger for indicating and registering the pressure. This device preferably comprises a rod 19 having an indicating scale or scales 20 thereon. The lower end of this rod is threaded as shown at 21 for receiving an adjusting screw 22 which engages with the upper portion of the piston 14. This screw is preferably provided with a lock nut 23 for locking it in adjusted position. A spring ring 24 is inserted between the flange 18 and the washer 16 and engages the rod or indicating member 19 so that it may be held in adjusted position after it has been acted upon by the piston. The rod or indicating member 19 is also provided with a head or cap 25 for pressing it back into the tube or for withdrawing it therefrom.

When the device is to be used for testing an engine, the spark plug is removed and the gauge is screwed into position in the place of the plug. The engine is then turned over and as the air or gases are compressed in the engine cylinder they will pass through the opening 11 into the tube or cylinder 8 and raise the piston against the compression of the spring 15 which is properly calibrated for registering such pressures. The movement of the piston projects the indicating member 19 outwardly and the pressure is indicated by the scale or scales thereon. The indicating member is held in its outermost position by the spring ring 24 so that the extreme pressure will be be indicated. When the pressure is reduced, the piston 14 will return to normal position, leaving the indicating member in its projected position until it is again pressed inwardly by the operator. It is well known that it is difficult to make compression springs sufficiently accurate so that they are uniform and the tension on the spring may also change after it has been used. For this reason the adjusting screw 22 which adjusts the indicating member with respect to the piston is an extremely desirable feature in connection with such gauges.

It will be noted that the details of construction may be modified in order to provide a gauge for different purposes or different engines and therefore I do not wish to be limited to the exact arrangement shown, except as specified in the following claims, in which I claim:

1. A compression gauge comprising a cylinder, having an inlet aperture at one end, a piston in said cylinder, a compression spring engaging with said piston, an abutment at the opposite end of the cylinder for engagement with the spring, an indicating rod coacting with said piston but disconnected therefrom and extending out through the end of the cylinder and means for adjusting the rod with respect to the piston to vary the position of the indicating marks on said rod with respect to the piston when the rod is in contact with the piston.

2. A gauge of the character set forth, comprising a cylindrical body portion, a connector at one end of the body portion, a piston in said cylinder, a compression spring engaging with said piston, an abutment at the opposite end of the cylinder for engagement with the spring, a cylindrical indicating rod coacting with said piston and extending out through the end of the cylinder, the end of said rod being adapted to engage with the piston but not connected thereto, means for adjusting the rod with respect to the piston to adjust the scale on said rod with respect to the piston when the rod and piston are in operative pressure indicating position and means for holding the rod in position for indicating the movement of the piston.

3. A compression gauge comprising a cylinder having an apertured washer with a central projection at one end thereof, a gasket engaging with the washer, a connecting member fitting over the cylinder and having an inwardly extending flange engaging with the gasket and adapted to hold the gasket and washer in position, said connecting member having threads on the outer surface thereof, a washer fitting over the opposite end of the cylinder, a cap engaging with the cylinder for holding said last named washer, a spring ring interposed between the washer and cap, a piston mounted in said cylinder, a compression spring between the piston and the last named washer and an indicating member engaging with the spring ring and adapted to be moved in one direction only by said piston.

4. In a pressure gauge, the combination of a cylinder, a piston in said cylinder, an indicating member adapted to be moved outwardly only by said piston, means for holding the indicating member in the position to which it is actuated by the piston, and means interposed between the indicating member and the piston for adjusting the distance between the piston and the indicating member, when said member is in operative engagement with the piston.

ALEX WATTERS.